US010776710B2

(12) United States Patent
Lin et al.

(10) Patent No.: US 10,776,710 B2
(45) Date of Patent: Sep. 15, 2020

(54) MULTIMODAL DATA FUSION BY HIERARCHICAL MULTI-VIEW DICTIONARY LEARNING

(71) Applicant: International Business Machines Corporation, Armonk, NY (US)

(72) Inventors: Ching-Yung Lin, Scarsdale, NY (US); Zhen Wen, Summit, NJ (US); Yale Song, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 806 days.

(21) Appl. No.: 14/667,415

(22) Filed: Mar. 24, 2015

(65) Prior Publication Data

US 2016/0283858 A1    Sep. 29, 2016

(51) Int. Cl.
| | | |
|---|---|---|
| *G06N 20/00* | (2019.01) | |
| *G06K 9/00* | (2006.01) | |
| *G06K 9/46* | (2006.01) | |
| *G06F 16/36* | (2019.01) | |
| *G06K 9/62* | (2006.01) | |
| *G06N 5/00* | (2006.01) | |

(52) U.S. Cl.
CPC ........... *G06N 20/00* (2019.01); *G06F 16/374* (2019.01); *G06K 9/00315* (2013.01); *G06K 9/46* (2013.01); *G06K 9/629* (2013.01); *G06K 9/6289* (2013.01); *G06N 5/003* (2013.01); *G06K 9/00375* (2013.01)

(58) Field of Classification Search
CPC .................................................... G06N 20/00
See application file for complete search history.

(56) References Cited

U.S. PATENT DOCUMENTS

| 6,175,772 | B1 * | 1/2001 | Kamiya ................. G06N 3/008 700/31 |
|---|---|---|---|
| 8,396,310 | B1 | 3/2013 | Kadambe et al. |
| 2006/0206313 | A1 | 9/2006 | Xu et al. |
| 2013/0236090 | A1 | 9/2013 | Porikli et al. |
| 2013/0300912 | A1 | 11/2013 | Tosic et al. |
| 2014/0072213 | A1 | 3/2014 | Paiton et al. |

OTHER PUBLICATIONS

Lee, Chan-Su and Rama Chellappa. "Sparse Localized Facial Motion Dictionary Learning for Facial Expression Recognition" May 9, 2014 [Online] Downloaded Sep. 7, 2017 http://ieeexplore.ieee.org/abstract/document/6854261/.*

(Continued)

*Primary Examiner* — Ben M Rifkin
(74) *Attorney, Agent, or Firm* — Anthony Curro; Michael J. Chang, LLC (57) ABSTRACT

Techniques for multimodal data fusion having a multimodal hierarchical dictionary learning framework that learns latent subspaces with hierarchical overlaps are provided. In one aspect, a method for multi-view data fusion with hierarchical multi-view dictionary learning is provided which includes the steps of: extracting multi-view features from input data; defining feature groups that group together the multi-view features that are related; defining a hierarchical structure of the feature groups; and learning a dictionary using the feature groups and the hierarchy of the feature groups. A system for multi-view data fusion with hierarchical multi-view dictionary learning is also provided.

15 Claims, 6 Drawing Sheets

(56) References Cited

OTHER PUBLICATIONS

Khan, Rizwan Ahem et al "Human Vision Inspired Framework for Faial Exprewssions Recognition" 2012 [Online] Downloaded Sep. 7, 2017 http://ieeexplore.ieee.org/stamp/stamp.jsp?arnumber=6467429.*

Madjarov, Gjorgji et al "An extensive experimental comparison of methods for mutli-label learning" 2012 [Online] Downloadd Sep. 7, 2017 http://ac.els-cdn.com/S0031320312001203/1-s2.0-S0031320312001203-main.pdf?_tid=dddb4ede-933d-11e7-ae7e-00000aab0f02&acdnat=1504728138_4ba0cbbb63c7b9c94cf324729316ac87.*

Jestes, Jeffrey "Intro to Data Structures" Verified by wayback machine to 2013 [Online] Downloaded Sep. 7, 2017 https://web.archive.org/web/20130126094029/https://www.cs.fsu.edu~jestes/cop3330/notes/datastruct.html.*

De Silva, Liyange, Tsutomo Miyasato, and Ryohei Nakatsu. "Facial Emotion Recognition Using Multi-modal information" 1997 [Online] Donwloaded May 15, 2018 https://ieeexplore.ieee.org/stamp/stamp.jsp?tp=&arnumber=647126.*

Gilbert, Andrew, John Illingworth, and Richard Bowden. "Action Recognition Using Mined Hierarchical Compound Features" 2010 [Online] Downloaded May 15, 2018 https://ieeexplore.ieee.org/stamp/stamp.jsp?tp=&arnumber=5551150.*

Zliobaite, Indre et al. "Next challenges for adaptive learning systems" 2012 [Online] Downloaded Aug. 17, 2019 See paragraph below for web address (Year: 2012).*
http://delivery.acm.org/10.1145/2410000/2408746/p48-zliobaite.pdf?ip=151.207.250.38&id=2408746&acc=ACTIVE%20SERVICE&key=C15944E53D0ACA63%2E4D4702B0C3E38B35%2E4D4702B0C3E38B35%2E4D4702B0C3E38B35&_acm_=1566047761_0e1db292b6d8bc79e5502ec12043ae3a.*

Mairal et al. "Online Dictionary Learning for Sparse Coding," Proceedings of the 26th International Conference on Machine Learning (ICML '09), pp. 689-696 (Jun. 2009).

Meinshausen et al., "High Dimensional Graphs and Variable Selection with the Lasso," The Annals of Statistics 34.3, 1436-1462 (Jun. 2006) (32 total pages).

R. Tibshirani, "Regression Shrinkage and Selection via the Lasso," Journal of the Royal Statistical Society Series B, 58 (1), 267-288 (1996).

Jia et al., "Factorized Latent Spaces with Structured Sparsity," Twenty-Fourth Annual Conference on Neural Information Processing Systems, 982-990 (Dec. 2010) (9 total pages).

Bengio et al., "Group Sparse Coding," Twenty-fourth Annual Conference on Neural Information Processing Systems (Dec. 2009) (8 total pages).

Jenatton et al., "Proximal Methods for Hierarchical Sparse Coding," Journal of Machine Learning Research 12:2297-2334 (Jul. 2011).

Lin et al., "Social Network Analysis in Enterprise," Proceedings of the IEEE, vol. 100, issue 9, pp. 2759-2776 (published Jul. 2012).

Castellano et al., "Multimodal emotion recognition from expressive faces, body gestures and speech," Artificial Intelligence and Innovations 2007: from Theory to Applications, IFIP, vol. 247, pp. 375-388 (Sep. 2007) (12 total pages).

Mairal et al. "Online Learning for Matrix Factorization and Sparse Coding," Journal of Machine Learning Research 11, pp. 19-60 (Jan. 2010).

Zubair et al., "Dictionary learning based sparse coefficients for audio classification with max and average pooling," Digital Signal Processing 23 (May 2013) 960-970.

Majdalawi, "Efficient Cluster Initialization Method Using Principle Component Analysis," Journal of American Science Dec. 2013; 9(12): 333-336.

Jacob et al., "Group Lasso with Overlap and Graph Lasso," Proceedings of the 26th International Conference on Machine Learning, Montreal Canada Jun. 2009 (8 total pages).

Monaci et al., "Learning Multi-Modal Dictionaries," IEEE Transactions on Image Processing, Sep. 2007, 16 (9), pp. 2272-2283 (12 total pages).

Zheng et al., "Multi-view Pedestrian Recognition Using Shared Dictionary Learning with Group Sparsity," ICONIP 2011, Part III, LNCS 7064, pp. 629-638 (Nov. 2011).

* cited by examiner

MULTIMODAL DATA FUSION BY HIERARCHICAL MULTI-VIEW DICTIONARY LEARNING

STATEMENT OF GOVERNMENT RIGHTS

This invention was made with Government support under Contract number W911NF-12-C-0028 awarded by Defense Advanced Research Projects Agency (DARPA). The Government has certain rights in this invention

FIELD OF THE INVENTION

The present invention relates to dictionary learning and multimodal data fusion, and more particularly, to sparse coding techniques for multimodal data fusion having a multimodal hierarchical dictionary learning framework that learns latent subspaces with hierarchical overlaps.

BACKGROUND OF THE INVENTION

The goal of data fusion is to obtain a discriminative representation of observations that are generated from multiple heterogeneous information sources (commonly called multi-view data or multimodal data). Multimodal data provides rich information that may not be obtained through a single input source alone. Data fusion has numerous real-world applications, such as multimodal sentiment analysis, multimedia information retrieval, and enterprise social network analysis. The machine learning community wishes to leverage the richness of information contained in multimodal data in order to understand complex statistical relationships among the variables of interest and to improve performance on various real-world prediction tasks.

One such real-world application of data fusion is in the automatic recognition of human emotion. Human emotion recognition has numerous applications in intelligent user interfaces and human-computer interaction. Building a system for automatic recognition of human emotion, however, presents several notable sub-challenges—from signal acquisition to processing, to the interpretation of the processed signals. Part of the difficulty comes from the fact that humans express emotions via multiple modalities, such as facial expressions, body gestures, and voice (both via its verbal content and prosody). This raises questions about when and how to combine the data from these multiple modalities, a problem commonly referred to as multimodal data fusion. Dealing with multimodal data is difficult for many reasons. First, each modality may have distinctive statistical properties (e.g., means and variances), while a set of modalities may exhibit shared statistical patterns (e.g., correlation and interaction). Thus, it is important to model modality-private and modality-shared patterns appropriately. Also, modalities can be redundant, complementary, and/or contradictory. Further, only some modalities may have useful information at a given time, and the structure of relevant modalities may change from time to time. Thus, techniques are needed to learn some structural information of the modalities and adaptively select only the relevant modalities (or subsets of variables from each modality).

Recently, there has been a surge of interest in using a sparse representation of input signals for multimodal data fusion. This technique assumes that an input space is inherently sparse, and represents the input as a linear combination of over-complete dictionary atoms, with a constraint being that the linear coefficients have to be sparse, i.e., only a few atoms are used to reconstruct the input signal. The dictionary is either manually constructed (e.g., wavelets) or automatically learned from the data, however recent studies have shown that dictionary learning has several advantages over manual construction of a dictionary, with improved performance in real-world problems.

In the unimodal setting, Meinshausen et al., "High Dimensional Graphs and Variable Selection with the Lasso," The Annals of Statistics 34.3, 1436-1462 (2006) proposed an approach based on LASSO to automatically select relevant variables out of redundant ones. That work however did not assume any group-structure among the input variables, making it unsuitable for multimodal data fusion. For a discussion of LASSO see R. Tibshirani, "Regression Shrinkage and Selection via the Lasso," Journal of the Royal Statistical Society Series B, 58(1), 267-288 (1996) (hereinafter "Tibshirani").

In the multimodal setting, Jia et al., "Factorized Latent Spaces with Structured Sparsity," Twenty-Fourth Annual Conference on Neural Information Processing Systems, 982-990 (December 2010) (hereinafter "Jia") applies group sparsity for learning a multimodal dictionary where some dictionary atoms correspond to the subspace that is shared across views (modality-shared latent subspaces), while other atoms correspond to the subspace private to each view (modality-private latent subspaces). It is proffered in Jia that the sparse representation obtained using their method shows superior performance in multi-view human pose estimation, which led them to suggest that it captures complex interdependencies in multimodal data. However, while the techniques presented in Jia take into account the group structure of the input variables (i.e., view definitions), they cannot incorporate the structural information among the groups (i.e., view-to-view relations).

Therefore, techniques for multimodal data fusion that can leverage this information about the structure among the groups would be desirable since this is necessary to achieve the sparsity over multiple heterogeneous input sources so as to enable selecting a few combinations of input views that best explains the task at hand.

SUMMARY OF THE INVENTION

The present invention provides sparse coding techniques for multimodal data fusion having a multimodal hierarchical dictionary learning framework that learns latent subspaces with hierarchical overlaps. In one aspect of the invention, a method for multi-view data fusion with hierarchical multi-view dictionary learning is provided. The method includes the steps of: extracting multi-view features from input data; defining feature groups that group together the multi-view features that are related; defining a hierarchical structure of the feature groups; and learning a dictionary using the feature groups and the hierarchy of the feature groups.

In another aspect of the invention, a system for multi-view data fusion with hierarchical multi-view dictionary learning is provided. The system includes a first group definition module configured to define feature groups from multi-view features extracted from input data, wherein the feature groups group together the multi-view features that are related; a second group definition module configured to define a hierarchical structure of the feature groups; and a dictionary module configured to learn a dictionary using the feature groups and the hierarchy of the feature groups.

A more complete understanding of the present invention, as well as further features and advantages of the present invention, will be obtained by reference to the following detailed description and drawings.

DETAILED DESCRIPTION OF PREFERRED EMBODIMENTS

The present techniques are the first to consider the group structure on both the input variables and the dictionary elements for multimodal data fusion. By comparison with conventional processes (see, for example, Jia—described above), the present techniques further demand the subspaces to form an overlapping hierarchical tree structure, so that the modality-shared latent subspaces are encouraged to model high-level concepts across sets of modalities (e.g., what the correlation and interaction patterns look like), while the modality-private latent subspaces are more tailored to model fine-grained details of each modality (e.g., what the mean and variance patterns look like). This present process enables the sparse representation of the multimodal signal to be more discriminative and accurate, which in turn makes human emotion recognition more robust. In addition, the present techniques have the added benefit that they can be used in a large variety of application domains that deal with data consisting of multiple heterogeneous sets of variables, e.g., multimedia information retrieval and enterprise social network analysis.

For instance, according to an exemplary embodiment, group sparsity is used to obtain sparse representation of multimodal/multi-view data, where the groups are defined by prior knowledge on which variables are believed to be generated from the same input source, thereby performing data fusion. It is noted that the terms "multimodal" and "multi-view," as well as "modality private/modality shared" and "view-private/view-shared" are used interchangeably herein.

A motivation behind the present work is the group sparsity in multi-view data, that is, only a few combinations of input views (or subspaces of the input space) are sufficient to reconstruct the observation that best describes the task at hand. Take the data observed from human emotion expressions as an example. Not all modalities are needed to infer the emotional state of a person. Often, it is sufficient to only look at the face or listen to the voice to make a reliable inference about the emotion. Group sparsity is used herein to achieve a similar effect. Specifically, provided herein is a multi-view hierarchical dictionary learning framework that learns latent subspaces with hierarchical overlaps. A mixed norm formulation will be defined that consists of a group-structured sparsity norm on the dictionary matrix and a tree-structured sparsity norm on the sparse coefficient matrix. A dictionary can then be built with hierarchically structured view subspaces, encouraging view-shared subspaces to capture high-level concepts, while encouraging view-private subspaces to capture fine-grained details.

Provided first below is a description of sparse coding and dictionary learning with structured sparsity, followed by a discussion of multi-view hierarchical dictionary learning in the next section. In the following description, lower-case letters denote scalars, lower-case bold-face letters denote vectors, and upper-case bold-face letters denote matrices. The i-th element of a vector is denoted by $x^i$, and the i-th row (column) of a matrix is denoted by $X^{i,\cdot}$ ($X^{\cdot,i}$); likewise, given a set of indices $\Omega$, a subvector or submatrix formed by taking $\Omega$ elements is denoted in similar ways.

Structured Dictionary Learning: The goal of sparse coding is to obtain a sparse representation of an input signal (also referred to herein as "input data") using an overcomplete dictionary (i.e., the number of dictionary entries exceeds the dimension of input signal) such that only a few dictionary entries are used to represent the input signal (hence the term "sparse"). Given an input signal $x \in \mathbb{R}^d$ and a dictionary $D \in \mathbb{R}^{d \times x}$, $k \gg d$, this goal can be formulated as finding a sparse signal $a \in \mathbb{R}^k$ (i.e., most of its elements are zero) that minimizes the LASSO problem, $$\min_{a \in \mathbb{R}^k} \frac{1}{2} \|x - D\alpha\|_2^2 + \lambda \|\alpha\|_1 \qquad (1)$$

wherein the first term measures reconstruction error, the second term is the $L_1$ norm that measures the sparsity of vector $\alpha$, and $\lambda$ controls the relative importance of the two terms. Namely, $\alpha$ contains few non-zero linear coefficients to the dictionary D that leads to the best approximation of x.

The dictionary D can be either manually defined or automatically learned from the data. In the latter case, given a dataset of N samples $X=[x_1, \ldots, x_N]$, a dictionary D can be learned by solving the following objective:

$$\min_{D} \frac{1}{N} \sum_{i=1}^{N} \min_{\alpha_i} \frac{1}{2} \|x_i - D\alpha_i\|_2^2 + \lambda \|a_i\|_1 \qquad (2)$$

For numerical stability, columns of D are constrained to be smaller than a unit norm, $\|D^{\cdot,i}\|_2^2 \leq 1$, $\forall i$. This optimization problem is convex in D with $A=[\alpha_1, \ldots, \alpha_N]$ fixed, and in A with D fixed, but not in both at the same time. It is thus solved by alternating the two convex optimization problems. Once the dictionary D is learned off-line, it can be used to encode each local feature x into α by solving Equation 1.

Structured sparsity encodes certain structural information in the data by encouraging groups of relevant coefficients to be active or zeroed out simultaneously. This is done by replacing the element-wise sparsity constraint of the $L_1$ norm with a group-wise sparsity inducing norm.

Let $\mathcal{G}=\{\Omega_1, \ldots, \Omega_{(i)}\}$ be a set of groups, with each group $\Omega_k$ containing a set of indices. Bengio et al., "Group Sparse Coding," Twenty-fourth Annual Conference on Neural Information Processing Systems (December 2009), the contents of which are incorporated by reference as if fully set forth herein, formulates structured sparsity given a set of groups $\mathcal{G}$ as $$\min_D \frac{1}{N} \sum_{i=1}^{N} \min_{\alpha_i} \frac{1}{2} \|x_i - D\alpha_i\|_2^2 + \lambda \Phi \mathcal{G}(\alpha_i) \quad (3)$$

where $\Phi^{\mathcal{G}}(\bullet)$ is a group-wise sparsity inducing norm that can take the form of $L_{1,p}$ defined as:

$$\|\alpha\|_{1,p} = \sum_{g=1}^{G} \|\alpha^{\Omega_g}\|_p = \sum_{g=1}^{G} \left(\sum_{j \in \Omega_g} |\alpha^j|^p\right)^{1/p} \quad (4)$$

This formulation has been shown to yield good performance in multi-class image classification tasks, where the groups are defined as the dictionary entries learned from the same image category. Group sparsity was then used to encourage certain groups of category-specific dictionary entries to be selected or opted out simultaneously in reconstructing the input image.

Following the idea of structured sparsity Jia (the contents of which are incorporated by reference as if fully set forth herein) proposed multi-view dictionary learning, where the groups are defined as indices of the input that correspond to the same view (e.g., variables of audio or visual features), and put an $L_{1,p}$ norm over the dictionary itself instead of on the sparse coefficients:

$$\min_D \frac{1}{N} \sum_{i=1}^{N} \min_{\alpha_i} \frac{1}{2} \|x_i - D\alpha_i\|_2^2 + \lambda_1 \|\alpha_i\|_1 + \sum_{j=1}^{k} \lambda_2 \Phi \mathcal{G}(D^{\cdot,j}). \quad (5)$$

Because the group definition matches with the view definition, the resulting dictionary will have columns that are specific to each view (all entries irrelevant to a given view are zero) as well as columns that are shared among a subset of (or all) views, thus learning a dictionary that encodes both view-private and view-shared subspaces of the data.

The proximal method has been used to solve the sparse coding problem with an overlapping group structure, and its performance has been evaluated on a scenario where the groups form a hierarchical tree structure. See, for example, Jenatton et al., "Proximal Methods for Hierarchical Sparse Coding," Journal of Machine Learning Research 12:2297-2334 (July 2011) (hereinafter "Jenatton"), the contents of which are incorporated by reference as if fully set forth herein. The hierarchical structure requires that a descendant node can be active if and only if its ancestor node is also active at the same time. By imposing this constraint, dictionary atoms that correspond to ancestor nodes will capture more "high level" concepts (e.g., global patterns), while the atoms that correspond to descendant nodes will capture more detailed concepts.

Hierarchical Multi-View Dictionary Learning:

Although current multi-view dictionary learning techniques (such as those in Jia) encode group structure of the input variables and find view-private and view-shared subspaces, they fails to model the relationship among the subspaces. According to the present techniques, it is determined that the subspaces themselves naturally form a hierarchical tree structure, and by leveraging that information a more discriminative representation of the input signal can be obtained which is suitable for high level prediction tasks.

Figure 1:
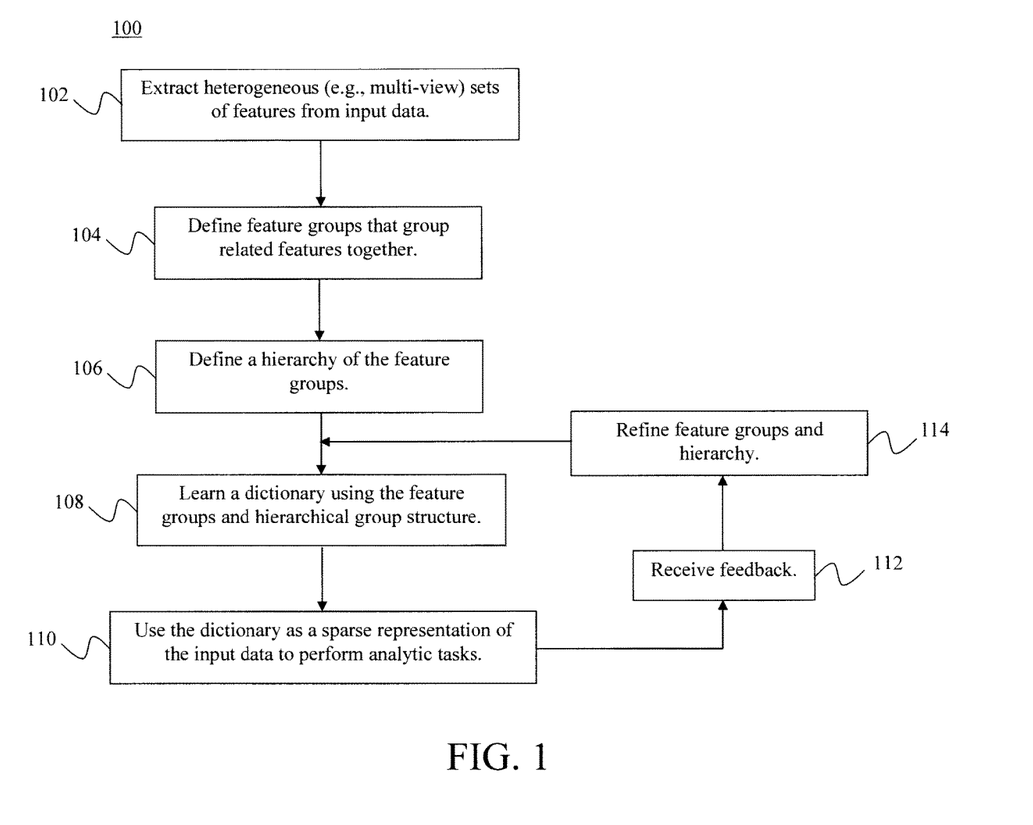
FIG. 1 is a diagram illustrating an exemplary methodology for multimodal data fusion with hierarchical multi-view dictionary learning according to an embodiment of the present invention.

Specifically, FIG. 1 is a diagram illustrating exemplary methodology 100 for multimodal data fusion with hierarchical multi-view dictionary learning. In step 102, heterogeneous sets of features (e.g., multi-view features) are extracted from input data. According to an exemplary embodiment, the input data is a set of signals collected from multiple modalities (wherein the signal from each modality can be of any type, e.g., location of facial landmarks and body joints). As will be described in detail below, using this input data the present techniques return a sparse representation of these multimodal signals as an output which, for example, can then be used as an input to a multimodal human emotion recognition system. By way of example only, step 102 may be performed using standard feature extraction techniques such as multimedia information retrieval and enterprise social network analysis. As is known in the art, multimedia information retrieval involves extracting semantic information from multimedia sources of data (e.g., text, audio, images, video, etc.). A description of enterprise social network analysis is provided, for example, in Lin et al., "Social Network Analysis in Enterprise," Proceedings of the IEEE, vol. 100, issue 9, pgs. 2759-2776 (July 2012), the contents of which are incorporated by reference as if fully set forth herein.

In accordance with the present techniques, two types of group structures will be defined. The first type, feature-groups, specifies feature-to-modality group membership. This first group structure groups together the multi-view features (from step 102) that are related. The second type, hierarchy of the feature groups, specifies a hierarchical tree structure over an enumeration of the modality power set (exemplary hierarchical group structures are provided and described in detail below). A user is given the option to provide either one of the two types of group definitions. However, if any of the two group definitions are not given, then the system (see FIG. 2—described below) will determine them directly from the input data via a suitable mathematical optimization criterion. Therefore, according to an exemplary embodiment, either of the two group definitions can be provided by domain experts or automatically (via a learning algorithm), thus adding flexibility to the system. The present techniques are the first to consider the group structure on both the input variables and the dictionary elements for multimodal data fusion.

Accordingly, the feature-groups structure is defined in step 104. Namely, in step 104 feature groups are defined which group related features (extracted from the input data) together. As highlighted above, this group structure can be defined using domain knowledge (if provided by the user) or a learning algorithm which learns the group structure from the input data, thus adding flexibility to the process. Next, the hierarchy of the feature group structure is defined in step 106. Namely, in step 106 a hierarchy (i.e., a hierarchical tree structure) of the feature groups (from step 104) is defined. As highlighted above, this group structure too can be defined using domain knowledge (if provided by the user) or a learning algorithm which learns the group structure from the input data.

In step 108, a dictionary is then learned using the feature groups and the hierarchical structure of the feature groups (defined in steps 104 and 106, respectively). The dictionary can then be used in a variety of analytics. For instance, in the example shown illustrated in FIG. 1, in step 110 the dictionary is used as a sparse representation of the input data to perform analytic tasks. For example, as provided above, the dictionary can be used as an input to a multimodal human emotion recognition system. Suitable multimodal human emotion recognition techniques that may be used in accordance with the present techniques are described, for example, in Castellano et al., "Multimodal emotion recognition from expressive faces, body gestures and speech," Artificial Intelligence and Innovations 2007: from Theory to Applications, IFIP, vol. 247, pp. 375-388 (2007) (hereinafter "Castellano"), the contents of which are incorporated by reference as if fully set forth herein.

As shown in FIG. 1, refinements can be made to fine-tune the group structure definitions. For example, in step 112 feedback can be obtained based on the analytics performed using the learned dictionary. For instance, analysts can review output data of the analytics and provide feedback on the results. The feedback can then be used in step 114 to refine the feature groups and/or the hierarchical group structure, with a goal towards improving the group structure definitions. The process can then be repeated using the refined group structures.

Figure 2:
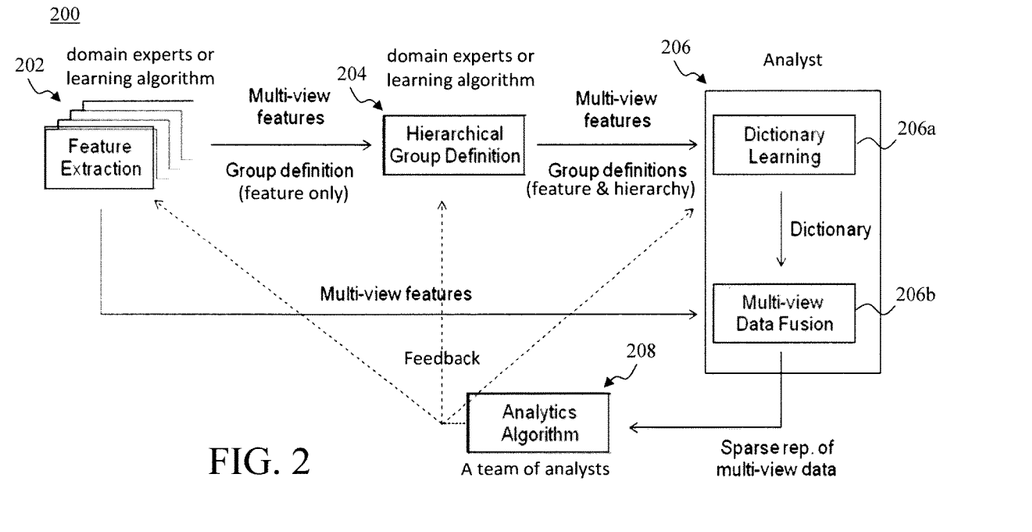
FIG. 2 is a diagram illustrating an exemplary system for implementing the present multimodal data fusion with hierarchical multi-view dictionary learning techniques according to an embodiment of the present invention.

FIG. 2 is a diagram illustrating an exemplary system 200 for implementing the present techniques. For instance, by way of reference to methodology 100 of FIG. 1, system 200 includes a (first) group definition module 202 for defining feature groups that group related features together (see step 104 of methodology 100). As provided above, these feature groups are defined from heterogeneous sets of features (i.e., multi-view features) extracted from input data (see step 102 of methodology 100) using either domain knowledge, if provided by the user, or learned directly from the input data, e.g., via a learning algorithm. In either case, module 202 will specify feature-to-modality group membership. According to an exemplary embodiment, the input data is multi-view data generated from multiple heterogeneous information sources.

As shown in FIG. 2, the feature group definition (labeled "Group definition (feature only)") is provided to a second group definition module 204, along with the multi-view feature data. Module 204 defines a hierarchy of the feature groups (see step 106 of methodology 100). As provided above, the hierarchical group definition can be provided by the user (e.g., a domain expert) or learned directly from the input data. In either case, module 204 will specify a hierarchical tree structure of the feature groups over an enumeration of the modality power set. As will be described in detail below, the hierarchical tree structure models the view-shared and the view-private subspaces.

Both group definitions (i.e., the feature group definition and the hierarchy of the feature groups—labeled "Group definitions (feature & hierarchy)") are then provided to a dictionary module 206 which serves to generate a sparse representation of the multi-view input data. According to an exemplary embodiment, dictionary module 206 includes a dictionary learning module 206a and a multi-view data fusion module 206b. As shown in FIG. 2, the dictionary learning module 206a is configured to learn a dictionary using the feature groups and the hierarchical group structure from modules 202 and 204, respectively. According to an exemplary embodiment, the dictionary learning module 206a is configured to run a dictionary learning algorithm such as that described for example in Mairal et al. "Online Learning for Matrix Factorization and Sparse Coding," Journal of Machine Learning Research 11, pgs. 19-60 (January 2010) (hereinafter "Mairal 2010"), the contents of which are incorporated by reference as if fully set forth herein, or in Mairal et al. "Online Dictionary Learning for Sparse Coding," Proceedings of the 26$^{th}$ International Conference on Machine Learning (ICML '09), pgs. 689-696 (June 2009) (hereinafter "Mairal 2009"), the contents of which are incorporated by reference as if fully set forth herein.

By way of example only, the dictionary provided by module 206a can then be used as a sparse representation of data to perform analytic tasks. As described for example in Mairal 2009, sparse coding involves modeling data vectors as sparse linear combinations of basis elements. In this case, the dictionary serves as a set of basis elements which is applied to the multi-view data via multi-view data fusion module 206b. See FIG. 2.

According to an exemplary embodiment, the multi-view data fusion module 206b is then used to solve a non-smooth convex optimization problem using the proximal method (see for example Jenatton). This non-smooth convex optimization problem is formulated herein as:

$$\min_{\substack{D^{(1)} \in \mathbb{R}^{d^{(1)} \times n} \\ \vdots \\ D^{(M)} \in \mathbb{R}^{d^{(M)} \times n} \\ A \in \mathbb{R}^{k \times n}}} \frac{1}{2} \sum_{m=1}^{M} \|x^{(m)} - D^{(m)}A\|_F^2 + \lambda_1 \sum_{m=1}^{M} \|(D^{(m)})^T\|_p + \lambda_2 \sum_{g \in \mathcal{G}} \|A_{g,\cdot}\|_q \quad (6)$$

wherein $X^{\{(m)\}}$ is a matrix of n input signals from the m$^{th}$ modality, $D^{\{(m)\}}$ is a matrix modality specific dictionary of k latent subspaces, A is a matrix of the corresponding sparse codes for n input signals, and M is the number of modalities. $\|\cdot\|$ is a Frobenius norm, the norms in the second and the third terms are general $L_{\{p\}}$ norms (either $L_{\{2\}}$ or $L_{\{\inf\}}$ is often used in practice). The first term measures the reconstruction error, the second term measures how sparse the dictionary $D^{\{(m)\}}$ is, and the third term measures how sparse the resulting sparse representation is. Two hyper parameters $\lambda_1$ and $\lambda_2$ decide the relative importance of the two terms. Solving Equation 6 is an iterative procedure—D is solved while fixing A, and vice versa. For example, as provided above, the dictionary learning algorithm provided in Mairal 2010 or Mairal 2009 may be used to solve D, and the proximal method provided in Jenatton may be used to solve A.

The result is a sparse representation (rep.) of the multi-view input data that can then be used to perform analytics. For example, as shown in FIG. 2, sparse representation of the multi-view input data can be provided as input to an analytics module 208. According to an exemplary embodiment, the analytics module 208 is a multimodal human emotion recognition system. As provided above, suitable multimodal human emotion recognition techniques that may be used in accordance with the present techniques are described, for example, in Castellano. This is however only an exemplary application. More generally, any variety of analytics may be performed using the sparse representation of the multi-view data from module 206 as input.

Further, as shown in FIG. 2 and as highlighted above, feedback can be obtained based on these analytics and used in step 114 to refine the feature groups and/or the hierarchical group structure. For instance, analysts can annotate whether the output is correct or not. Then the learning algorithms in 202 or 204 will be able to know how to increase the importance of features or hierarchical groups that created correct detection, and how to decrease the importance of features or hierarchical groups that caused errors. This feedback process can be used to iteratively improve the group structure definitions. See description of FIG. 1, above.

Figure 3:
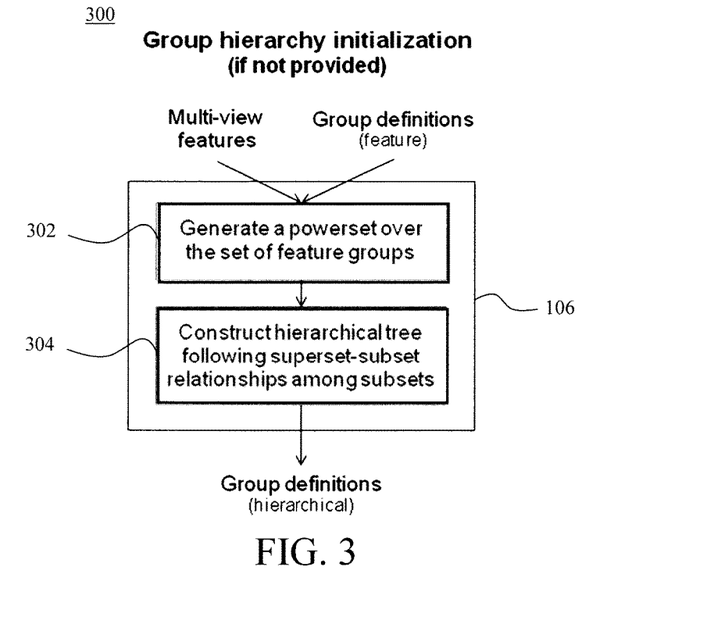
FIG. 3 is a diagram illustrating an exemplary methodology for defining a hierarchy of the feature groups according to an embodiment of the present invention.

FIG. 3 is a diagram illustrating an exemplary methodology 300 for defining a hierarchy of the feature groups. Methodology 300 provides an exemplary process for performing step 106 of methodology 100 of FIG. 1 when a group definition of the feature groups has not been provided by the user (see above). Methodology 300 may be performed by the group definition module 204 of system 200. See FIG. 2.

Namely, in step 302, the multi-view feature data (i.e., the heterogeneous sets of features extracted from the input data as per step 102 of FIG. 1) and the feature groups (which group related features together and are defined as per step 104 of FIG. 1) are used to generate a power set over the feature groups. As provided above, the feature groups are one of two types of group structures defined in accordance with the present techniques. The feature group definition specifies feature-to-modality group membership and, if not provided by the user, can be determined directly from the input data. Generally, the power set of a set S is the set of all subsets of the set S, including the empty set and S itself.

In step 304, a hierarchical tree structure is constructed following the superset-subset relationships among the subsets (i.e., subspaces) in the power set. A detailed description of the present hierarchical tree concept and illustrative examples will be provided below. In general, by way of example only, a superset-subset relation exists among subspaces A (e.g., the superset) and B (e.g., the subset) when the superset has all of the attributes of the subset in addition to attributes the subset does not have.

As shown in FIG. 3, the outcome of methodology 300 is the hierarchical group definition. The hierarchical group definition specifies a hierarchical tree structure over an enumeration of the modality power set from step 302 and is the second type of group structure defined in accordance with the present techniques. As has now been demonstrated, if not provided by the user the hierarchical structure of the feature groups can be determined directly from the input data as per methodology 300.

Figure 4:
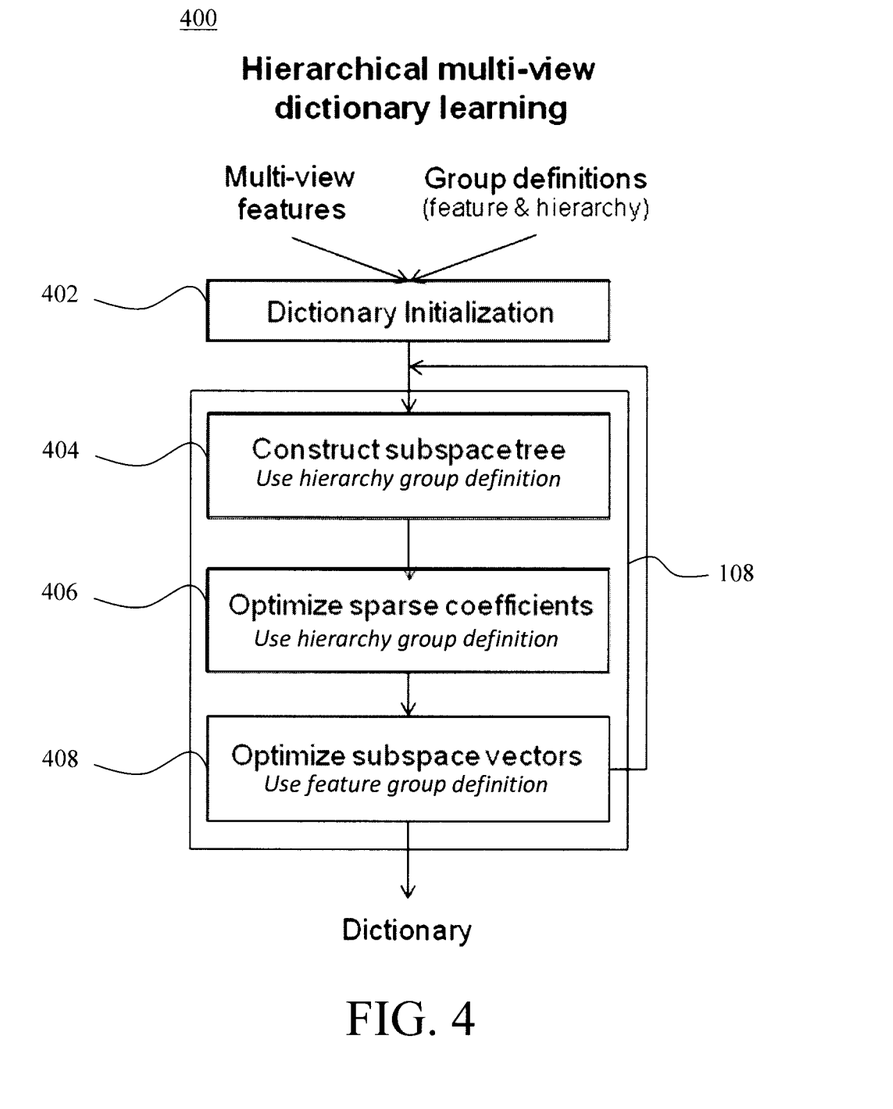
FIG. 4 is a diagram illustrating an exemplary methodology for learning a dictionary using the multi-view feature data, the feature groups, and the hierarchical group structure according to an embodiment of the present invention.

As highlighted above, the hierarchical group definition along with the feature group definition and the multi-view feature data are then used to learn a (hierarchical multi-view) dictionary. See, for example, FIG. 4. FIG. 4 is a diagram illustrating an exemplary methodology 400 for learning a dictionary using the multi-view feature data, the feature groups, and the hierarchical structure of the feature groups (e.g., either provided by the user or determined from the input data as per methodology 300 of FIG. 3). Methodology 400 provides an exemplary process for performing step 108 of methodology 100 of FIG. 1. Methodology 400 may be performed by the module 206 of system 200. See FIG. 2.

With sparse coding, data vectors are modeled as sparse linear combinations of basis elements, wherein a set of the basis elements (i.e., a basis set) is often referred to as a dictionary. See Mairal 2009. The data vector entries in the dictionary are commonly referred to as 'dictionary elements' or 'atoms.' See, for example, Zubair et al., "Dictionary learning based sparse coefficients for audio classification with max and average pooling," Digital Signal Processing 23 (May 2013) 960-970 (hereinafter "Zubair"), the contents of which are incorporated by reference as if fully set forth herein. In accordance with the present techniques, each dictionary entry represents one subspace.

Further, a structured sparsity constraint can be employed to increase the efficiency and effectiveness of the sparse approximation. Namely, instead of selecting atoms in the dictionary individually, the concept of structured sparsity entails picking groups of atoms using a priori knowledge about the problem to directly constrain the possible sparsity patterns. See Jenatton. For example, as provided in Jenatton, in many applied settings such as for the sparse coding of images the spatial arrangement of pixels in the image induces relationships between the dictionary atoms. These relationships can be used to constrain the sparsity pattern.

According to an exemplary embodiment, the structured sparsity problem is applied to multi-view data using a hierarchical structure and dictionary learning. Namely, in accordance with the present techniques a sparse representation of multi-view data is obtained using dictionary learning by factorizing feature space into hierarchically-structured latent subspaces. View-shared and view-private patterns are modeled as factorized subspaces and the structural pattern among views is modeled as a hierarchy of subspaces. To date, no techniques exist that employ dictionary learning to model hierarchically organized multi-view subspaces.

The dictionary learning technique employed herein generally involves an iterative process which begins with an initial dictionary matrix. See step 402. By way of example only, step 402 may be performed by the dictionary learning module 206a of system 200. See FIG. 2. According to an exemplary embodiment, the dictionary initialization in step 402 is performed using a decomposition technique, such as principle component analysis (PCA), or by randomization or random sub-sampling from the given dataset. For a description of principle component analysis see, for example, Majdalawi, "Efficient Cluster Initialization Method Using Principle Component Analysis," Journal of American Science December 2013; 9(12):333-336, the contents of which are incorporated by reference as if fully set forth herein. As provided above, the present dictionary learning techniques are applied to model hierarchically organized multi-view subspaces. Accordingly, as shown in FIG. 4, the multi-view data is organized using the hierarchical tree structure to create the initial dictionary in step 402. As described above, the hierarchical tree structure can be provided by the user or determined from the input data as per methodology 300 of FIG. 3.

The initial dictionary can be used to calculate a matrix of sparse coefficients (see, for example, Zubair) which are also referred to herein as sparse codes. As is known in the art, input data can oftentimes be represented by a small set of coefficients. This technique is commonly employed in data compression. By way of example only, a digital image is composed of a plurality of pixels. The set of pixel values representing a given image is dense. A wavelet transform can be applied to the pixel values, which will produce an equivalent number of coefficients as pixels. However, the information in the image is oftentimes statistically concentrated in just a few coefficients. Namely, only a few components of the image are non-zero, and the rest are zero. Further, with sparse coding, the small coefficients (i.e., those coefficients having less than a preset value) can be set to zero. As a result, the dense matrix of pixel values for an image is transformed to a sparse matrix of coefficients (i.e., sparse codes).

The dictionary is then refined using an iterative process which, as highlighted above, involves optimizing the sparse coefficient (sparse code) matrix while fixing the dictionary, and vice versa. By way of example only, the steps of this dictionary refinement process may be performed by the multi-view data fusion module 206b of system 200. See FIG. 2. In step 404 a current set of subspaces are assigned to the hierarchical tree structure of the feature groups. According to an exemplary embodiment, the assignments are made by finding a map between subspace vectors and nodes of the hierarchical tree structure of the feature groups. Exemplary hierarchical tree structures are described below.

In step 406, the matrix of sparse coefficients (sparse codes) is optimized while the dictionary is kept fixed (i.e., the dictionary elements are kept fixed). According to an exemplary embodiment, the dictionary optimization in methodology 400 is carried out using the optimization problem formulated in Equation 6, above, wherein $D^{\{(m)\}}$ is a matrix modality specific dictionary of k latent subspaces and A is a matrix of the corresponding sparse codes for n input signals. For example, in step 406, A in Equation 6 is solved while fixing D. By way of example only, the proximal method provided in Jenatton may be used to solve A.

In step 406, the reconstruction must obey the structure of the current hierarchical tree. A tree node can be selected in signal reconstruction only when all of its parent nodes are selected. This effectively enforces view-shared subspaces to be used more frequently and thus high-level patterns that occur over multiple views. With conventional multi-view dictionary learning processes, there is no assumption on the structure among dictionary entries.

In step 408, the dictionary is optimized while the sparse coefficient (sparse code) matrix is kept fixed. When methodology 400 is carried out using the optimization problem formulated in Equation 6 above, then in step 406 D in Equation 6 is solved while fixing A. By way of example only, the dictionary learning algorithm provided in Mairal 2010 or Mairal 2009 may be used to solve D.

In step 408, each subspace vector is encouraged to contain minimal groups of non-zero coefficients. As shown in FIG. 4, the dictionary process is iterative. Namely, steps 404-408 are repeated until convergence. The result is the learned dictionary (see step 108 of methodology 100 in FIG. 1).

Figure 5:
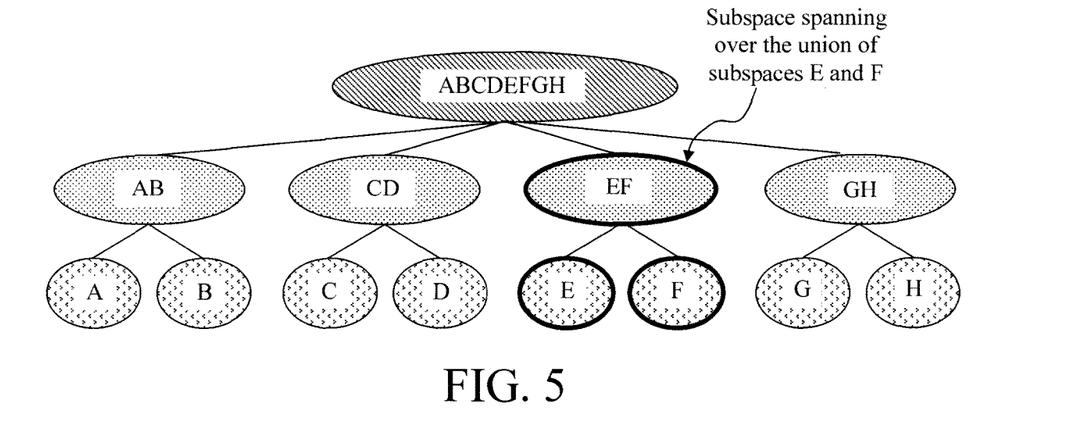
FIG. 5 is a diagram illustrating an exemplary hierarchical tree structure according to an embodiment of the present invention.

As provided above, a better representation of multi-view data is obtained herein by factorizing feature space into hierarchically-structured latent subspaces. An exemplary hierarchical tree structure is shown illustrated in FIG. 5. This hierarchy structure is defined manually (using domain knowledge) or learned automatically from the data. In the example shown, a subspace EF is highlighted which spans over the union of subspaces E and F. Each node in this hierarchical tree data structure (also referred to herein as a "tree node") is labeled with a letter or letters. A tree node can have one or more parent nodes and/or one more child nodes. By way of example only, the tree node labeled EF has two child nodes (i.e., the nodes labeled E and F) and one parent node (i.e., the node labeled ABCDEFGH).

Figure 6:
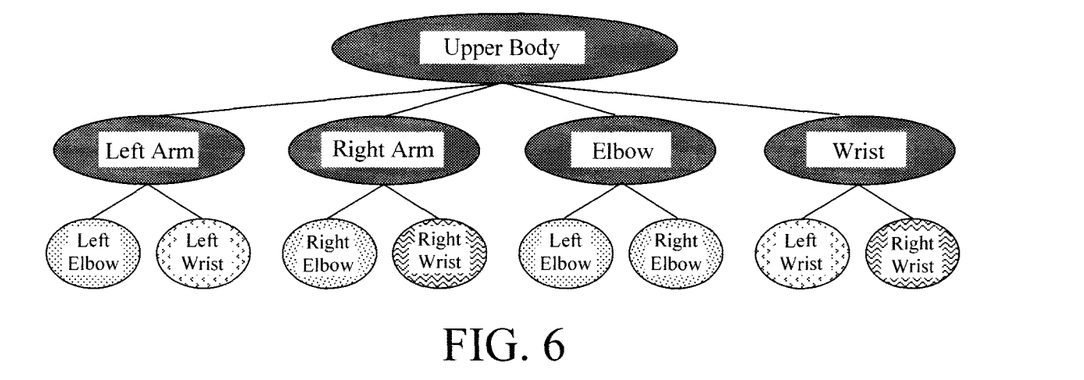
FIG. 6 is a diagram illustrating an exemplary tree structure being used to encode a hierarchical group structure of human anatomy according to an embodiment of the present invention.
Figure 7:
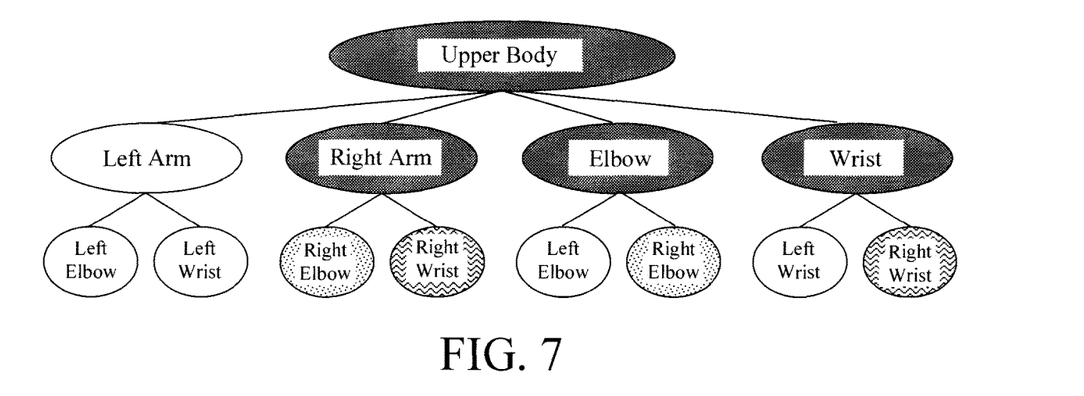
FIG. 7, which follows from FIG. 6, is a diagram illustrating the instance when the right arm is moving according to an embodiment of the present invention.
Figure 8:
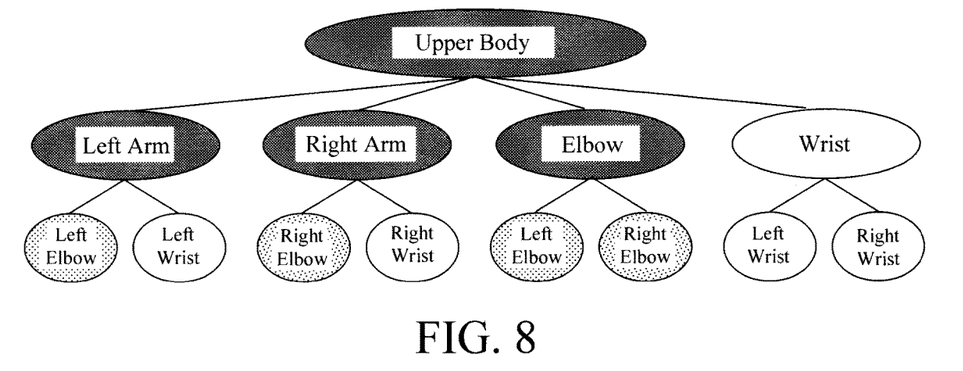
FIG. 8, which follows from FIG. 6, is a diagram illustrating the instance when both elbows are moving according to an embodiment of the present invention.

To further illustrate the present techniques, an example is provided in FIG. 6 wherein the present tree structure is used to encode a hierarchical group structure of human anatomy. In this particular case, an example of upper body gesture recognition is shown. Specifically, upper body gesture recognition in this example is based on movement of the upper body features, including the arms elbows and wrists. For example, FIG. 7 illustrates the instance when the right arm is moving, and FIG. 8 illustrates the instance when both elbows are moving.

As provided above, in accordance with the present techniques a tree node can be selected in signal reconstruction only when all of its parent nodes are selected. This concept is exemplified in FIGS. 7 and 8. For instance, in FIG. 7 the node labeled Right Elbow can only be selected if all of its parent nodes are selected—which they are.

Figure 9:
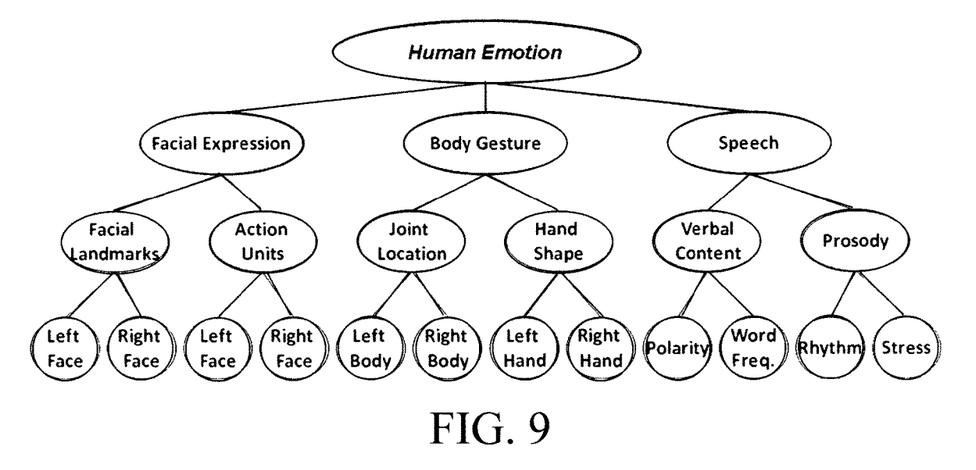
FIG. 9 is a diagram illustrating an example of the present tree structure being used to encode a hierarchical group structure of human emotion according to an embodiment of the present invention.

FIG. 9 is an example of the present tree structure being used to encode a hierarchical group structure of human emotion. Specifically, human emotion in this example is based on facial expressions, body gestures and speech. Facial expression includes landmarks and action units of the face. Action units are the actions of individual muscles or groups of muscles. Body gestures include body joint location and hand shape. Speech indicators include verbal content and prosody of speech.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
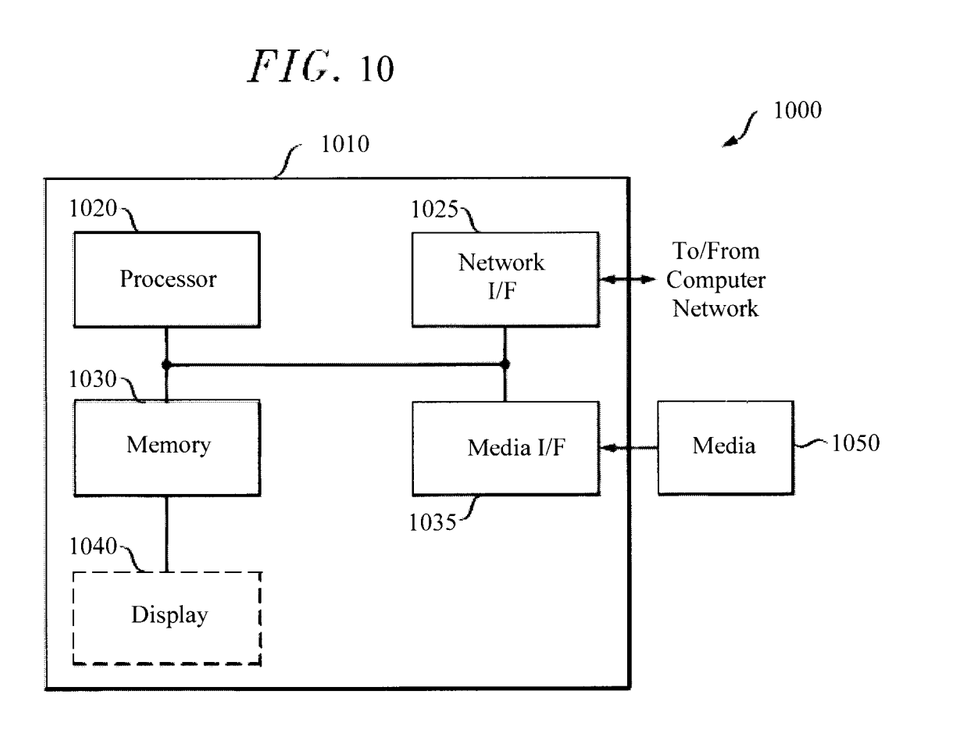
FIG. 10 is a diagram illustrating an exemplary apparatus for performing one or more of the methodologies presented herein according to an embodiment of the present invention.

Turning now to FIG. 10, a block diagram is shown of an apparatus 1000 for implementing one or more of the methodologies presented herein. By way of example only, apparatus 1000 can be configured to implement one or more of the steps of methodology 100 of FIG. 1, one or more of the steps of methodology 300 of FIG. 3, and/or one or more of the steps of methodology 400 of FIG. 4. For instance, according to an exemplary embodiment, system 200 of FIG. 2 may be embodied in apparatus 1000.

Apparatus 1000 includes a computer system 1010 and removable media 1050. Computer system 1010 includes a processor device 1020, a network interface 1025, a memory 1030, a media interface 1035 and an optional display 1040. Network interface 1025 allows computer system 1010 to connect to a network, while media interface 1035 allows computer system 1010 to interact with media, such as a hard drive or removable media 1050.

Processor device 1020 can be configured to implement the methods, steps, and functions disclosed herein. The memory 1030 could be distributed or local and the processor device 1020 could be distributed or singular. The memory 1030 could be implemented as an electrical, magnetic or optical memory, or any combination of these or other types of storage devices. Moreover, the term "memory" should be construed broadly enough to encompass any information able to be read from, or written to, an address in the addressable space accessed by processor device 1020. With this definition, information on a network, accessible through network interface 1025, is still within memory 1030 because the processor device 1020 can retrieve the information from the network. It should be noted that each distributed processor that makes up processor device 1020 generally contains its own addressable memory space. It should also be noted that some or all of computer system 1010 can be incorporated into an application-specific or general-use integrated circuit.

Optional display 1040 is any type of display suitable for interacting with a human user of apparatus 1000. Generally, display 1040 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for multi-view data fusion with hierarchical multi-view dictionary learning, the method comprising the steps of:
- extracting multi-view features from input data, wherein the input data is obtained from multimedia sources of data;
- defining feature groups that group together the multi-view features that are related;
- defining a hierarchical structure of the feature groups, wherein the hierarchical structure of the feature groups comprises a tree structure that is learned from the input data by: using the multi-view features and the feature groups to generate a power set over the feature groups, and constructing the hierarchical structure of the feature groups following superset-subset relationships among subsets in the power set, wherein a superset-subset relationship exists among a superset and a subset when the superset has all of the attributes of the subset in addition to attributes the subset does not have;
- learning a dictionary, as a sparse representation of the input data, using the feature groups and the hierarchy of the feature groups to model hierarchically-organized multi-view subspaces from the input data, where each entry in the dictionary represents one subspace, wherein the dictionary D is automatically learned, for a given dataset of N samples $X=[x_1, \ldots, x_N]$, by:

$$\min_D \frac{1}{N} \sum_{i=1}^{N} \min_{\alpha_i} \frac{1}{2} \|x_i - D\alpha_i\|_2^2 + \lambda \|a_i\|_1,$$

wherein vector α contains sparse coefficients to the dictionary D that leads to an approximation of x, and wherein λ is a hyper parameter;
- using the dictionary as input to perform analytic tasks for multimodal reconstruction of human emotion expression whereby the tree structure encodes a hierarchical group structure of human emotion using facial expressions, body gestures and speech indicators;
- refining at least one of the feature groups and the hierarchical structure of the feature groups based on feedback from the analytic tasks performed using the dictionary; and
- repeating the using and refining steps in an iterative manner.

2. The method of claim 1, further comprising the step of: using the dictionary as input to a multimodal human emotion recognition system.

3. The method of claim 1, wherein the input data comprises a set of signals collected from multiple modalities selected from the group consisting of: text, audio, images and video.

4. The method of claim 1, wherein the feature groups are defined using domain knowledge provided by a user.

5. The method of claim 1, wherein the step of defining the feature groups comprises the step of:
- learning the feature groups directly from the input data via a mathematical optimization criterion.

6. The method of claim 1, wherein the hierarchical structure of the feature groups is defined using domain knowledge.

7. The method of claim 1, wherein the step of learning the dictionary using the feature groups and the hierarchy of the feature groups comprises the steps of:
- organizing the multi-view features using the feature groups and the hierarchical structure of the feature groups to create an initial dictionary;
- calculating a matrix of sparse coefficients using the initial dictionary;
- assigning subspaces to the hierarchical structure of the feature groups;
- optimizing the matrix of sparse coefficients while keeping dictionary elements in the dictionary fixed;
- optimizing the dictionary while keeping the matrix of sparse coefficients fixed; and
- repeating the steps of assigning the subspaces to the hierarchical structure of the feature groups, optimizing the matrix of sparse coefficients, and optimizing the dictionary until convergence.

8. The method of claim 7, wherein the step of assigning the subspaces to the hierarchical structure of the feature groups comprises the step of:
- finding a map between subspace vectors and nodes of the hierarchical structure of the feature groups.

9. The method of claim 1, further comprising the step of:
- obtaining the feedback from analysts reviewing output data from the analytic tasks.

10. A system for multi-view data fusion with hierarchical multi-view dictionary learning, the system comprising a processor device, connected to a memory, operative to:
- define feature groups from multi-view features extracted from input data, wherein the input data is obtained from multimedia sources of data, and wherein the feature groups group together the multi-view features that are related;
- define a hierarchical structure of the feature groups, wherein the hierarchical structure of the feature groups comprises a tree structure that is learned from the input data by: using the multi-view features and the feature groups to generate a power set over the feature groups, and constructing the hierarchical structure of the feature groups following superset-subset relationships among subsets in the power set, wherein a superset-subset relationship exists among a superset and a subset when the superset has all of the attributes of the subset in addition to attributes the subset does not have;
- learn a dictionary, as a sparse representation of the input data, using the feature groups and the hierarchy of the feature groups to model hierarchically-organized multi-view subspaces from the input data, where each entry in the dictionary represents one subspace, wherein the dictionary D is automatically learned, for a given dataset of N samples $X=[x_1, \ldots, x_N]$, by:

$$\min_D \frac{1}{N} \sum_{i=1}^{N} \min_{\alpha_i} \frac{1}{2} \|x_i - D\alpha_i\|_2^2 + \lambda \|a_i\|_1,$$

wherein vector α contains sparse coefficients to the dictionary D that leads to an approximation of x, and wherein λ is a hyper parameter; and
- use the dictionary as input to perform analytic tasks for multimodal reconstruction of human emotion expression whereby the tree structure encodes a hierarchical group structure of human emotion using facial expressions, body gestures and speech indicators, wherein the processor device is further operative to refine, in an iterative manner, at least one of the feature groups and the hierarchical structure of the feature groups based on feedback from the analytic tasks performed using the dictionary.

11. The system of claim 10, wherein the input data comprises a set of signals collected from multiple modalities selected from the group consisting of: text, audio, images and video.

12. The system of claim 10, wherein the processor device is further operative to learn the feature groups directly from the input data via a mathematical optimization criterion.

13. The system of claim 10, wherein the processor device is further operative to:
  organize use the multi-view features using the feature groups and the hierarchical structure of the feature groups to create an initial dictionary;
  calculate a matrix of sparse coefficients using the initial dictionary;
  assign subspaces to the hierarchical structure of the feature groups;
  optimize the matrix of sparse coefficients while keeping dictionary elements in the dictionary fixed;
  optimize the dictionary while keeping the matrix of sparse coefficients fixed; and
  repeat the steps of assigning the subspaces to the hierarchical structure of the feature groups, optimizing the matrix of sparse coefficients, and optimizing the dictionary until convergence.

14. A computer program product for multi-view data fusion with hierarchical multi-view dictionary learning, the computer program product comprising a computer readable storage medium having program instructions embodied therewith, the program instructions executable by a computer to cause the computer to:
  extract multi-view features from input data, wherein the input data is obtained from multimedia sources of data;
  define feature groups that group together the multi-view features that are related;
  define a hierarchical structure of the feature groups, wherein the hierarchical structure of the feature groups comprises a tree structure that is learned from the input data by: using the multi-view features and the feature groups to generate a power set over the feature groups, and constructing the hierarchical structure of the feature groups following superset-subset relationships among subsets in the power set, wherein a superset-subset relationship exists among a superset and a subset when the superset has all of the attributes of the subset in addition to attributes the subset does not have;
  learn a dictionary, as a sparse representation of the input data, using the feature groups and the hierarchy of the feature groups to model hierarchically-organized multi-view subspaces from the input data, where each entry in the dictionary represents one subspace, wherein the dictionary D is automatically learned, for a given dataset of N samples $X=[x_1, \ldots, x_N]$, by:

$$\min_D \frac{1}{N} \sum_{i=1}^{N} \min_{\alpha_i} \frac{1}{2} \|x_i - D\alpha_i\|_2^2 + \lambda \|a_i\|_1,$$

wherein vector $\alpha$ contains sparse coefficients to the dictionary D that leads to an approximation of x, and wherein $\lambda$ is a hyper parameter;
  use the dictionary as input to perform analytic tasks for multimodal reconstruction of human emotion expression whereby the tree structure encodes a hierarchical group structure of human emotion using facial expressions, body gestures and speech indicators;
  refine at least one of the feature groups and the hierarchical structure of the feature groups based on feedback from the analytic tasks performed using the dictionary; and
  repeat the use and refine steps in an iterative manner.

15. The computer program product of claim 14, wherein the input data comprises a set of signals collected from multiple modalities selected from the group consisting of: text, audio, images and video.

* * * * *